(12) United States Patent
Tsai

(10) Patent No.: US 11,427,732 B2
(45) Date of Patent: Aug. 30, 2022

(54) EASY-TO-PEEL ECO-FRIENDLY ADHESIVE TAPE

(71) Applicant: WILL TREND CORPORATION, Taipei (TW)

(72) Inventor: San-Chai Tsai, Taipei (TW)

(73) Assignee: WILL TREND CORPORATION, Taipei (TW)

( * ) Notice: Subject to any disclaimer, the term of this patent is extended or adjusted under 35 U.S.C. 154(b) by 143 days.

(21) Appl. No.: 16/994,669

(22) Filed: Aug. 17, 2020

(65) Prior Publication Data
US 2022/0049128 A1 Feb. 17, 2022

(51) Int. Cl.
*C09J 7/20* (2018.01)

(52) U.S. Cl.
CPC ........... *C09J 7/20* (2018.01); *B32B 2307/732* (2013.01); *C09J 2301/122* (2020.08); *C09J 2301/30* (2020.08); *Y10T 428/28* (2015.01)

(58) Field of Classification Search
CPC .... C09J 7/20; C09J 2301/122; C09J 2301/30; B32B 2307/732; Y10T 428/28
See application file for complete search history.

(56) References Cited

U.S. PATENT DOCUMENTS

| | | | | |
|---|---|---|---|---|
| 6,117,262 A | * | 9/2000 | Moulds | C09J 7/30 156/289 |
| 6,291,044 B1 | * | 9/2001 | Chayka | C09J 7/20 428/41.9 |
| 2001/0052382 A1 | * | 12/2001 | Moulds | B65D 5/0236 156/289 |
| 2003/0031836 A1 | * | 2/2003 | Iwami | C09J 7/20 428/194 |
| 2004/0237325 A1 | * | 12/2004 | Blau | C09J 7/38 33/758 |
| 2009/0061222 A1 | * | 3/2009 | Grobe | G09F 3/0292 428/343 |
| 2018/0339828 A1 | * | 11/2018 | Lin | C09J 7/38 |

FOREIGN PATENT DOCUMENTS

JP H08269410 A * 10/1996

OTHER PUBLICATIONS

Machine translation of JP-H08269410-A. (Year: 1996).*

* cited by examiner

*Primary Examiner* — Patricia L. Nordmeyer
(74) *Attorney, Agent, or Firm* — Li & Cai Intellectual Property Office

(57) ABSTRACT

An easy-to-peel eco-friendly adhesive tape includes a film substrate, an adhesive layer, and a first print layer. The film substrate has a first surface and a second surface. The first surface has a surface energy greater than 36 dyne/cm. The adhesive layer is disposed on the first surface of the film substrate, and extends from one lengthwise edge towards the lengthwise edge of the film substrate, and does not reach the other side of the film substrate. Therefore, the first surface of the film substrate close to the other side has no adhesive layer. The first print layer is disposed on the first surface of the film substrate in a printing manner, and the first print layer is disposed on the first surface of the film substrate without the adhesive layer, and forms a peeling part. The adhesive tape can be thoroughly separated from the cardboard box.

9 Claims, 7 Drawing Sheets

EASY-TO-PEEL ECO-FRIENDLY ADHESIVE TAPE

CROSS-REFERENCE TO RELATED PATENT APPLICATION

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an easy-to-peel eco-friendly adhesive tape, and more particularly to a thin-film adhesive tape product, which is eco-friendly for easily separating a paper from a non-paper material, and intended to protect contents in a cardboard box from being damaged by a knife or a sharp object.

BACKGROUND OF THE DISCLOSURE

The conventional packing adhesive tape for either an automatic packing machine or for manual packaging, has one surface which is fully covered with adhesive paste (hereafter as "adhesive"). After the upper, lower, left, and right cardboard flaps of a cardboard box are tightly sealed with the adhesive tape, due to the adhesive tape being fully covered with adhesive and being tightly adhered to the cardboard box, the adhesive tape is difficult to be separated from the cardboard box. In order to easily take out the contents in the cardboard box, most people use a knife or a sharp tool to cut the adhesive tape to access the contents on the inside. The contents in the cardboard box may be accidentally damaged by the knife or the sharp tool, and a residue of a thin film adhesive tape remains on the cardboard box, which may affect the subsequent recycling process, that is, paper material and plastic film are not being thoroughly separated and sorted, which leads to a plastic film pollution problem in paper pulp during the manufacture of recycled paper. An additional separating process is required, which incurs a higher cost.

Moreover, BOPP (biaxially oriented polypropylene) film adhesive tape is a consumable and is widely used in all types of companies, and whether being used for packing products or shipping samples, it is economical and affordable. The adhesive tape is also the most-handy and essential packing material in every household, and is the most consumed adhesive tape in the world.

SUMMARY OF THE DISCLOSURE

In response to the above-referenced technical inadequacies, the present disclosure provides an easy-to-peel eco-friendly adhesive tape, which can be easily and completely separated from a cardboard box when an end-user receives a cardboard box parcel, so that the plastic film can be easily separated from the cardboard box for recycling and waste sorting, to achieve the purpose of environmental protection.

In one aspect, the present disclosure provides an easy-to-peel eco-friendly adhesive tape, which includes a film substrate, an adhesive layer, and a first print layer. The film substrate has a first surface and a second surface. The first surface and the second surface are defined on two opposite surfaces of the film substrate. The first surface has a surface energy greater than 36 dynes per centimeter. The adhesive layer is disposed on the first surface of the film substrate. The adhesive layer is extended transversely from one lengthwise edge of the film substrate toward the other lengthwise edge of the film substrate, and not extended to the other lengthwise edge of the film substrate. The adhesive layer is spaced apart from the other lengthwise edge of the film substrate. The first surface of the film substrate does not have the adhesive layer disposed thereon close to the other lengthwise edge of the film substrate. The first print layer is disposed on the first surface of the film substrate in a printing manner. The first print layer is close to the other lengthwise edge of the film substrate. The first print layer is disposed on a portion of the first surface of the film substrate without the adhesive layer, and the first print layer forms a peeling part.

In certain embodiments of the present disclosure, the film substrate has a first width, the adhesive layer has a second width, the first print layer has a third width, and a sum of the second width and the third width is equal to the first width.

In certain embodiments of the present disclosure, the third width is smaller than the second width.

In certain embodiments of the present disclosure, a second print layer is further disposed on the first surface of the film substrate between the film substrate and the adhesive layer, and the second print layer has a print different from that of the first print layer.

Therefore, the easy-to-peel eco-friendly adhesive tape of the present disclosure has the effects as below, which includes the film substrate, the adhesive layer, and the first print layer. The consideration of the present disclosure is mainly based on the environmental protection, by improving the adhesive tape; an end-user can easily and completely separate the adhesive tape from a cardboard box when receiving a cardboard box parcel. Therefore, a plastic film can be easily separated from the cardboard box for recycling and waste sorting, to achieve the purpose of environmental protection.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
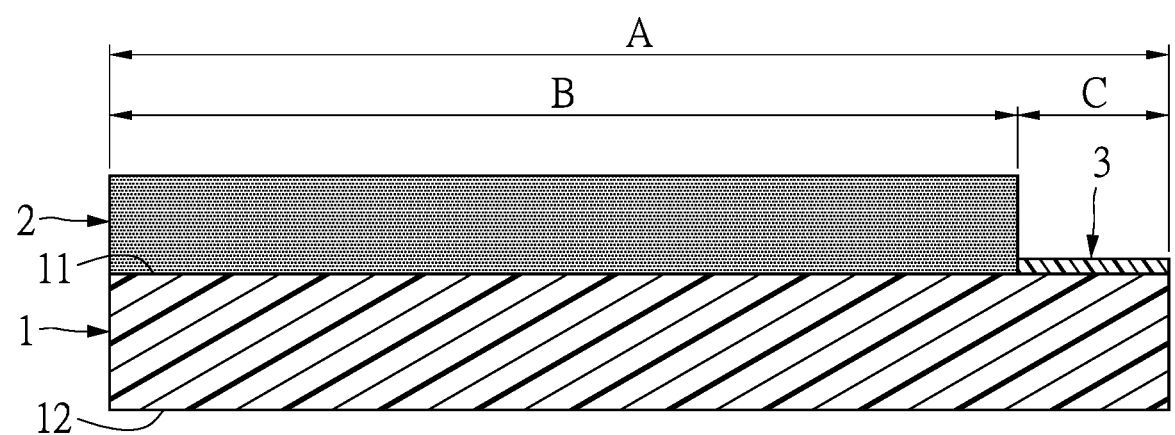
FIG. 1 is a cross-sectional view of an easy-to-peel eco-friendly adhesive tape according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

The present disclosure provides an easy-to-peel eco-friendly adhesive tape, especially a plastic film type adhesive tape, such as a BOPP film (biaxially oriented polypropylene), or polyester film adhesive tape, and other products. The most common adhesive tape in the market used to package cardboard boxes has specifications of 48 mm, 60 mm, or 72 mm in width. The most widely used specification worldwide is 48 mm. Thus, the present disclosure exemplifies the easy-to-peel eco-friendly adhesive tape in the specification of 48 mm width.

Referring to FIG. 1, the easy-to-peel eco-friendly adhesive tape of the present disclosure provides a film substrate 1, an adhesive layer 2, and a first print layer 3. The film substrate 1 is made of a transparent film, such as a polypropylene film or a polyester film. However, the material of the film substrate 1 is not limited thereto. The film substrate 1 has a long strip shape. The film substrate 1 has a first surface 11 and a second surface 12. The first surface 11 and the second surface 12 are on two opposite surfaces of the film substrate 1, respectively. The present disclosure utilizes the characteristic of the first surface 11 of the film substrate 1 to improve a higher surface energy, so that the first print layer 3 and the adhesive layer 2 have no problem of peeling and transferring. For example, the second surface 12 is not processed and has a surface energy between 31 to 32 dyne/cm, and the first surface 11 is processed to have a surface energy greater than 36 dyne/cm, which preferably is greater than 38 dyne/cm. Therefore, a secondary process is not needed, and the cost can be reduced.

The adhesive layer 2 is applied to the first surface 11 of the film substrate 1. The adhesive layer 2 is extended along a longitudinal direction of the film substrate 1. The adhesive layer 2 is further extended from one lengthwise edge of the film substrate 1 (the left side as shown in FIG. 1) toward the other lengthwise edge (the right side as shown in FIG. 1), but the adhesive layer 2 does not reach to the other lengthwise edge of the film substrate 1. Specifically, one side of the adhesive layer 2 can be aligned to one lengthwise edge of the film substrate 1. The other side of the adhesive layer 2 is separated from the other lengthwise edge of the film substrate 1, and the portion of the first surface 11 of the film substrate 1 close to the other lengthwise edge has no adhesive layer 2. In other words, a portion of the first surface 11 of the film substrate 1 is not applied with adhesive, and the adhesive tape is not fully applied with adhesive.

The first print layer 3 is disposed on the first surface 11 of the film substrate 1 in a printed manner. The first print layer 3 is extended along a lengthwise direction of the film substrate 1. A print of the first print layer 3 can be one or a combination of color, pattern, symbol, trademark, and text. However, the print of the first print layer 3 is not limited thereto. The first print layer 3 is arranged close to the other lengthwise edge of the film substrate 1. The first print layer 3 is applied to the portion of the first surface 11 of the film substrate 1 without the adhesive layer, so that the first print layer 3 can form a peeling part or a peeling strip. As described above, the print of the first print layer 3 is not limited thereto. Any practical design can be used, for example, a partial strip of a made-up adhesive tape is not applied with an adhesive for an end-user being able to pick up the adhesive tape easily, and has a print for helping the end-user to easily recognize the peeling part as a pick-beginning portion to peel the adhesive tape. Therefore, the end-user can easily recognize the peeling part, which is not applied with adhesive and is an area having the print, so as to completely remove the adhesive tape from another side of the joint of the cardboard box from the peeling part.

The film substrate 1 can have a first width A. The adhesive layer 2 can have a second width B. The first print layer 3 can have a third width C. Preferably, a sum of the second width B and the third width C is equal to the first width A, so that the adhesive layer 2 and the first print layer 3 can be applied on the whole first surface 11 of the film substrate 1. Preferably, the third width C is smaller than the second width B. In other words, a width of the first print layer 3 does not need to be too large, as long as the adhesive tape is recognized by the user and can be conveniently peeled off.

In this embodiment, the first width A is 48 mm, the second width B is 44 mm, and the third width C is 4 mm. Preferably, the third width C is from 3 mm to 5 mm. However, sizes of the first width A, the second width B, and the third width C are not limited thereto, which can be changed according to practical requirements. The thickness of the film substrate 1, the adhesive layer 2, and the first print layer 3 are not limited thereto. Preferably, the thickness of the first print layer 3 is smaller than that of the adhesive layer 2.

Figure 2:
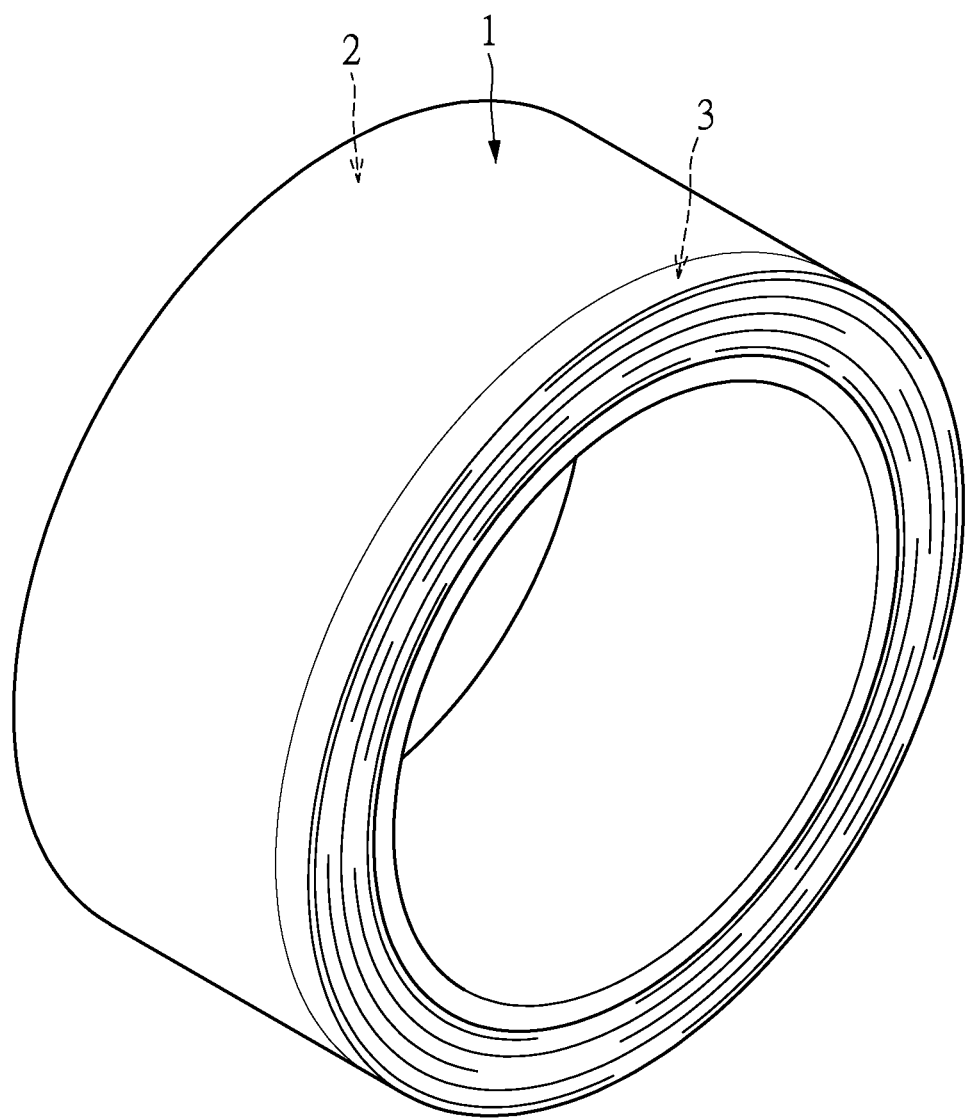
FIG. 2 is a perspective view of the easy-to-peel eco-friendly adhesive tape wrapped in a roll according to the first embodiment of the present disclosure.

Since the product of the adhesive tapes have different widths, the width of the peeling part without the adhesive (the first print layer 3) can be different, so that the adhesive tape products can meet users' different sized fingers. Therefore, all of the peeling parts without the adhesive can be easily picked up, and the sealed adhesive tape can be fully separated from the cardboard box. After the easy-to-peel eco-friendly adhesive tape of the present disclosure is produced, it can be rolled up in a roll, as shown in FIG. 2, so as to enable convenient sealing of a cardboard box.

Second Embodiment

Figure 3:
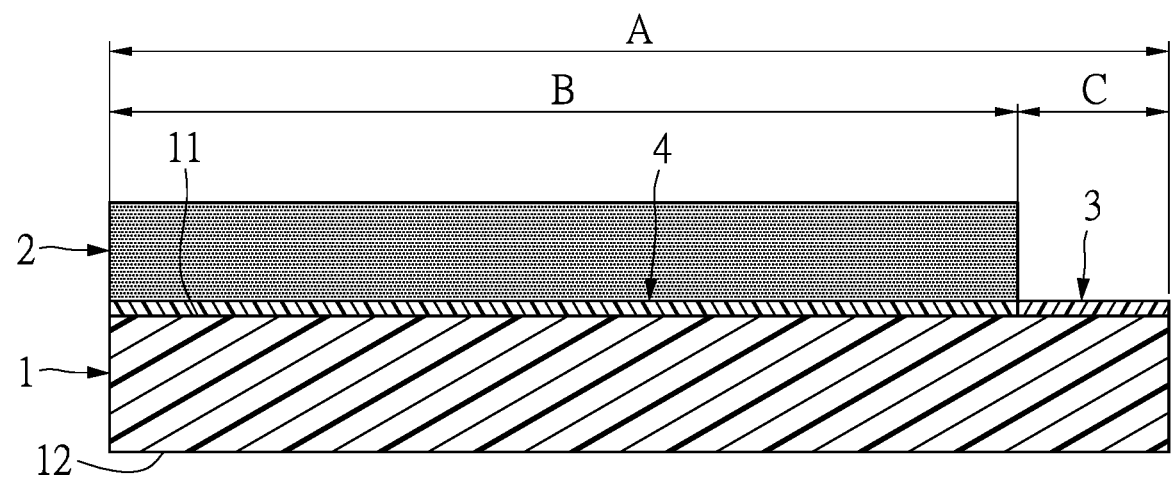
FIG. 3 is a cross-sectional view of an easy-to-peel eco-friendly adhesive tape of a second embodiment according to the present disclosure.

Referring to FIG. 3, an easy-to-peel eco-friendly adhesive tape of another embodiment according to the present disclosure is illustrated. In this embodiment, the easy-to-peel eco-friendly adhesive tape has a film substrate 1, an adhesive layer 2, and a first print layer 3. This embodiment is substantially the same as the first embodiment, the difference is that, besides having the first print layer 3 at a portion without an adhesive, the first surface 11 of the film substrate 1 further has a second print layer 4 which is formed between the film substrate 1 and the adhesive layer 2. The width of the second print layer 4 can be equal to that of the adhesive layer 2 (that is the second width B). Preferably, the thickness of the first print layer 3 can be equal to that of the second print layer 4. The second print layer 4 can be printed with any print different from that of the first print layer 3. In other words, the first print layer 3 and the second print layer 4 have different prints, which can help to distinguish the peeling part. The print of the second print layer 4 can be one or a combination of color, pattern, symbol, trademark, and text. However, the print of the second print layer 4 is not limited thereto.

Figure 4:
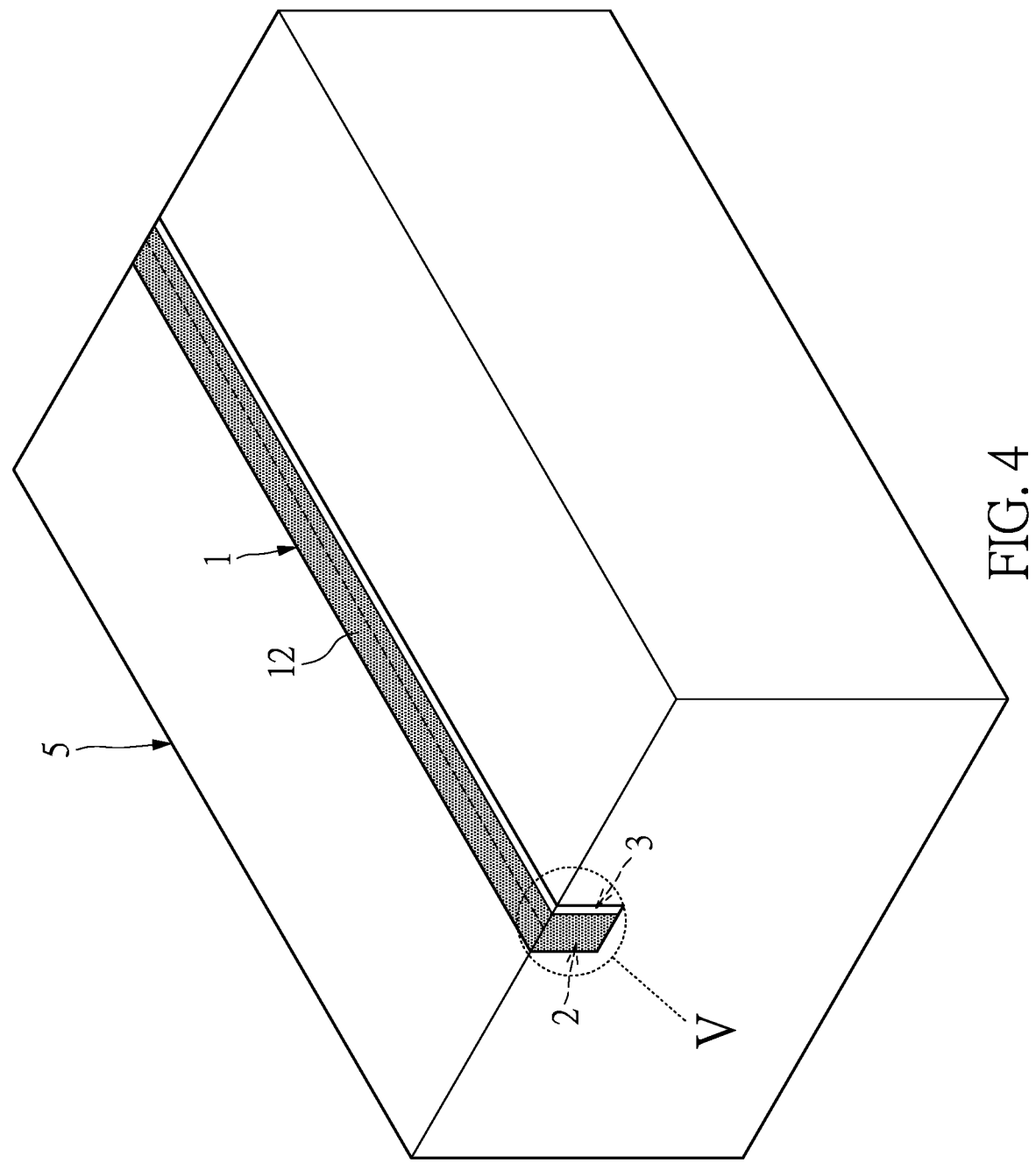
FIG. 4 is a perspective view of the adhesive tape attached to a cardboard box according to the present disclosure.
Figure 5:
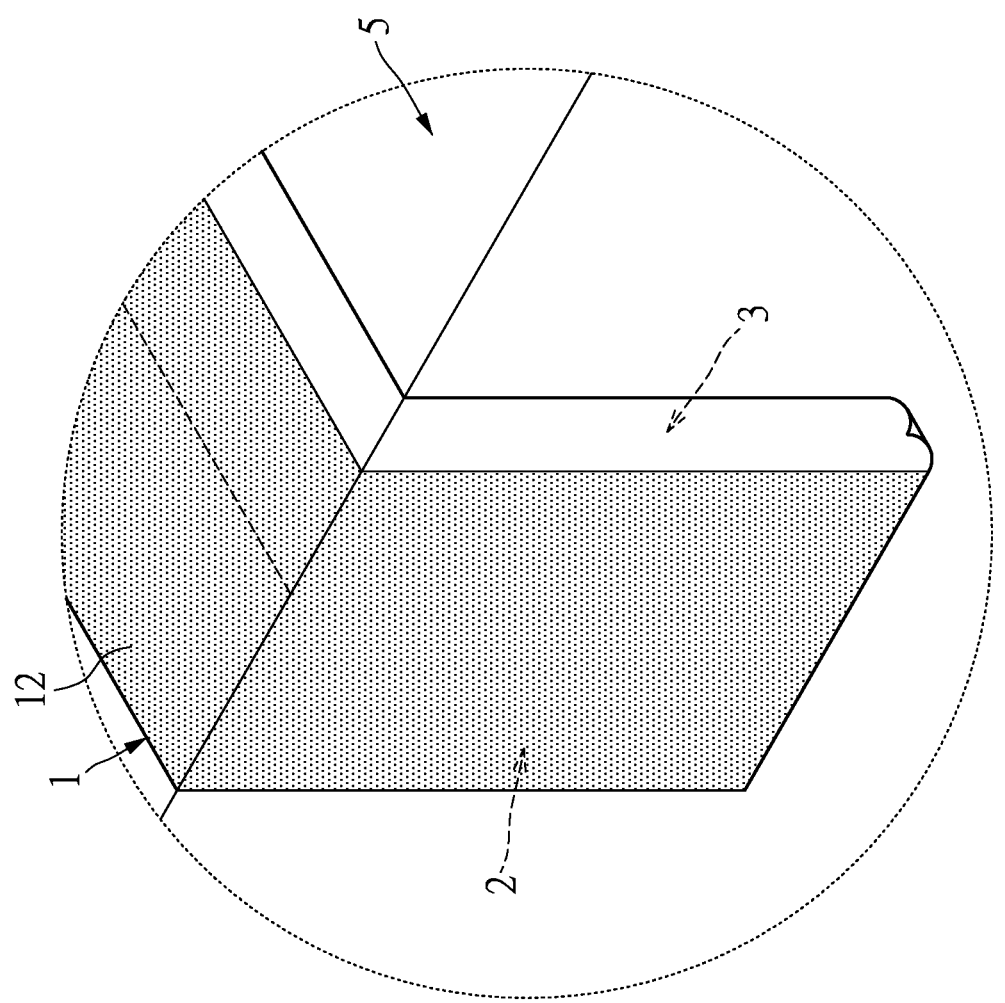
FIG. 5 is an enlarged view of a "V" part in FIG. 4 illustrating a peeling part of the adhesive tape being picked up according to the present disclosure.
Figure 6:
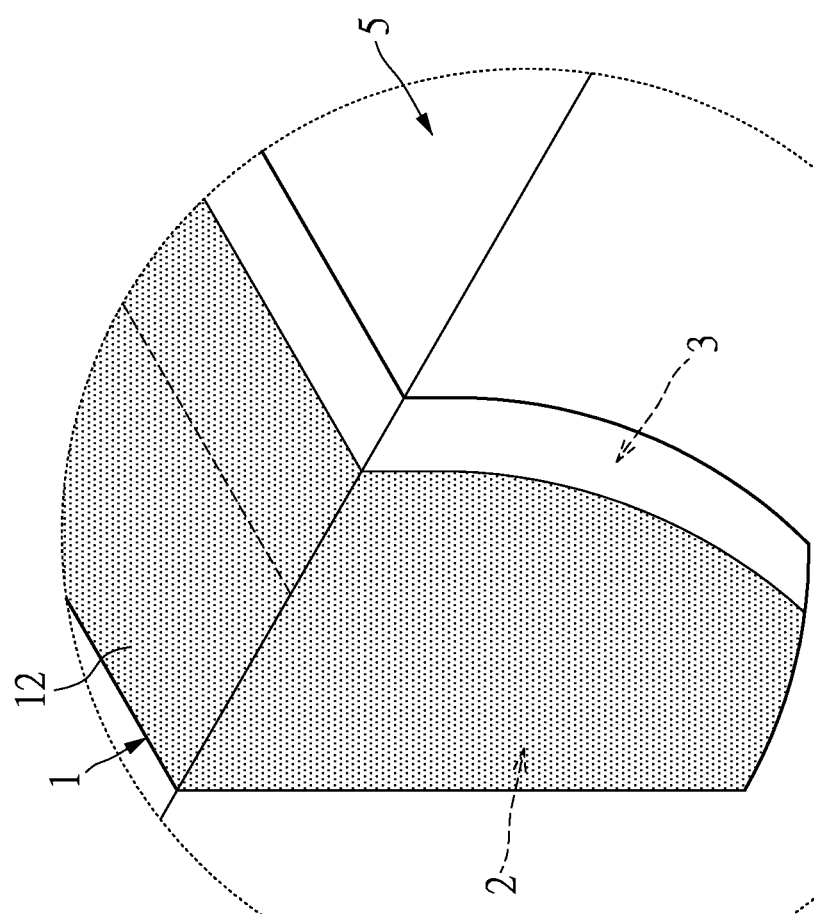
FIG. 6 is an enlarged view followed by FIG. 5 illustrating the adhesive tape being pulled off continuously according to the present disclosure.
Figure 7:
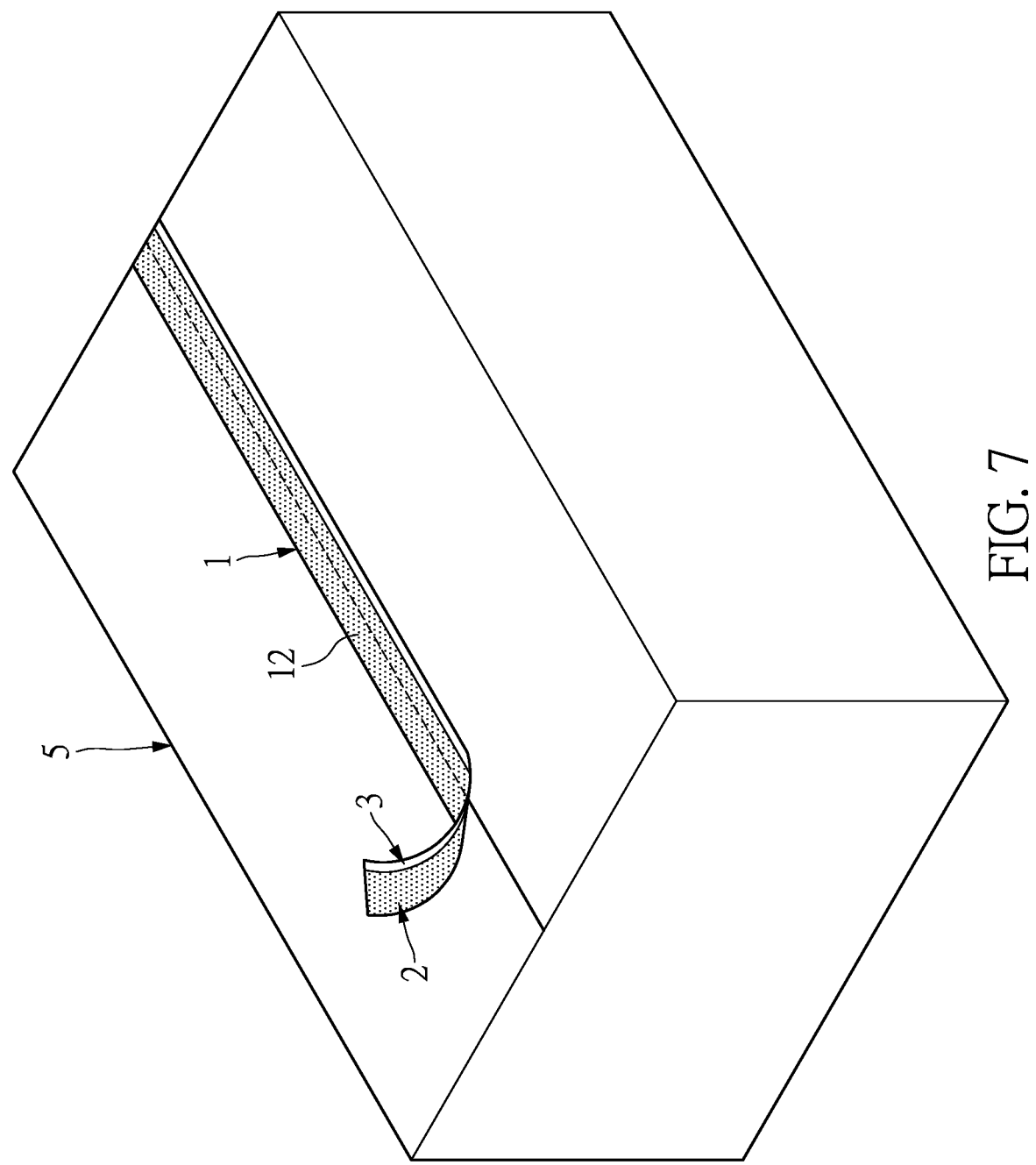
FIG. 7 is a perspective view of the cardboard box illustrating the adhesive tape being pulled off toward another end according to the present disclosure.

Referring to FIG. 4, the adhesive tape can be adhered to a joint of the cardboard box 5 by the adhesive layer 2, so that the cardboard box 5 is sealed. The present disclosure mainly utilizes the spaced adhesive, and the adhesive is applied at intervals on the transparent film substrate 1 in strip shape according to the customer's requirement specification. Different from the conventional adhesive tape with adhesive in a full manner, the film substrate 1 has a portion adjacent to one side thereof which has no adhesive and is arranged as the first print layer 3. When an end-user wants to open the cardboard box 5, the end-user can easily pick up the peeling part without the adhesive of the adhesive tape, as shown in FIG. 5, and continuously remove the adhesive tape toward another side of the joint of the cardboard box 5, as shown in FIGS. 6 and 7, to completely separate the adhesive tape from the cardboard box 5. For the end-user to conveniently distinguish the peeling part of the adhesive tape on the cardboard box, the first print layer 3 is disposed on the peeling part where it does not have adhesive, so that consumers can easily identify this strip-shaped printed area as the peeling part. The adhesive tape therefore can be easily peeled and removed from one joint end of the cardboard box 5 toward the other end, so that the adhesive tape can be thoroughly separated from the cardboard box 5.

In conclusion, the easy-to-peel eco-friendly adhesive tape of the present disclosure includes a film substrate, an adhesive layer, and a first print layer. The packing adhesive tape utilizes two surfaces of the film substrate having different surface energy. The surface with a higher energy is first processed with printing, whether a simple print of the first print layer or a further print of the second print layer. Such a simple design does not increase cost by much, but makes great progress in environmental protection and the recycling process. The present disclosure utilizes the area without adhesive as the peeling part, so that the adhesive tape can be thoroughly separated from the cardboard box or other paper packing material from the peeling part.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An easy-to-peel eco-friendly adhesive tape, comprising:
a film substrate having a first surface and a second surface, the first surface and the second surface being defined on two opposite surfaces of the film substrate, wherein the first surface is processed to have a first surface energy greater than 36 dynes per centimeter, and the first surface energy of the first surface is greater than a second surface energy of the second surface without any processed process;
an adhesive layer disposed on the first surface of the film substrate, the adhesive layer extending transversely from one lengthwise edge of the film substrate toward the other lengthwise edge of the film substrate and not extending to the other lengthwise edge of the film substrate, the adhesive layer being spaced apart from the other lengthwise edge of the film substrate, so that the first surface of the film substrate does not have the adhesive layer disposed thereon close to the other lengthwise edge of the film substrate; and
a first print layer being disposed on the first surface of the film substrate in a printing manner, the first print layer being close to the other lengthwise edge of the film substrate, wherein the first print layer is disposed on a portion of the first surface of the film substrate without the adhesive layer, and the first print layer forms a peeling part so as to completely separate the adhesive tape from a cardboard box.

2. The easy-to-peel eco-friendly adhesive tape according to claim 1, wherein the film substrate has a first width, the adhesive layer has a second width, the first print layer has a third width, and a sum of the second width and the third width is equal to the first width.

3. The easy-to-peel eco-friendly adhesive tape according to claim 2, wherein the third width is smaller than the second width.

4. The easy-to-peel eco-friendly adhesive tape according to claim 1, wherein a thickness of the first print layer is smaller than a thickness of the adhesive layer.

5. The easy-to-peel eco-friendly adhesive tape according to claim 1, wherein a print of the first print layer is one or a combination of color, pattern, symbol, trademark, and text.

6. The easy-to-peel eco-friendly adhesive tape according to claim 1, wherein a second print layer on the first surface of the film substrate is further disposed between the film substrate and the adhesive layer, and the second print layer has a print different from that of the first print layer.

7. The easy-to-peel eco-friendly adhesive tape according to claim 6, wherein a width of the second print layer is equal to a width of the adhesive layer.

8. The easy-to-peel eco-friendly adhesive tape according to claim 6, wherein a thickness of the first print layer is equal to a thickness of the second print layer.

9. The easy-to-peel eco-friendly adhesive tape according to claim 6, wherein the second print layer is one or a combination of color, pattern, symbol, trademark, and text.

\* \* \* \* \*